June 6, 1939.  R. W. HARROUN ET AL  2,161,160
WHEEL GUARD
Filed March 19, 1935   2 Sheets-Sheet 1
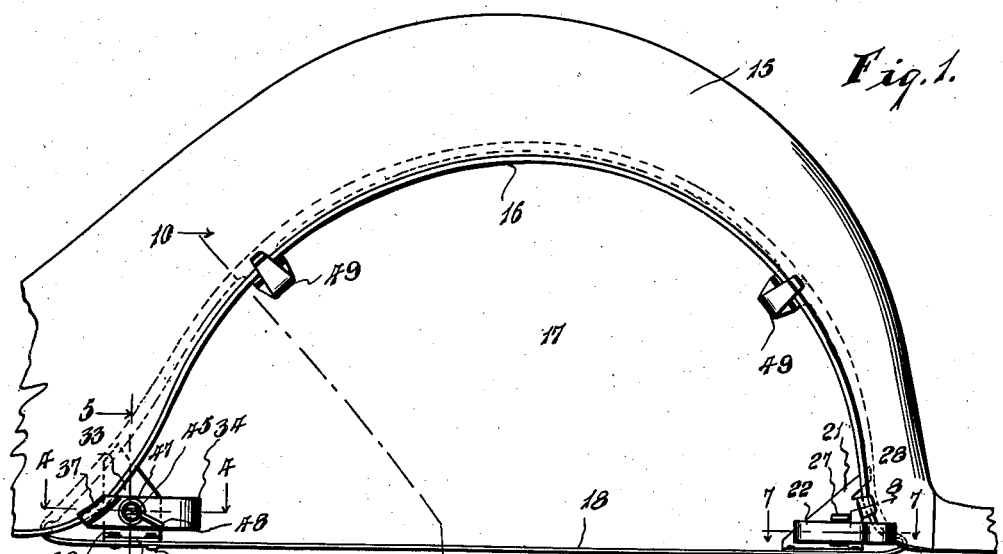
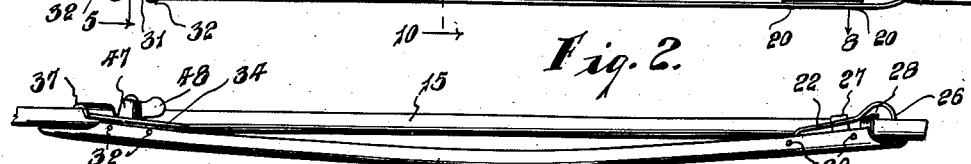
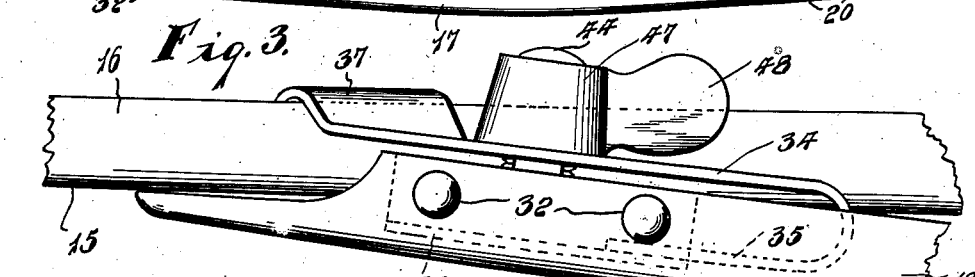
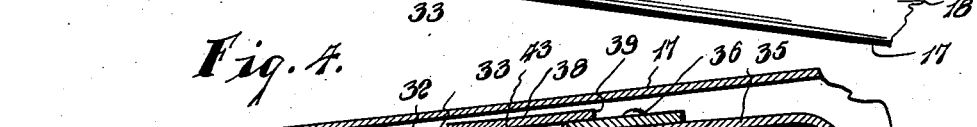
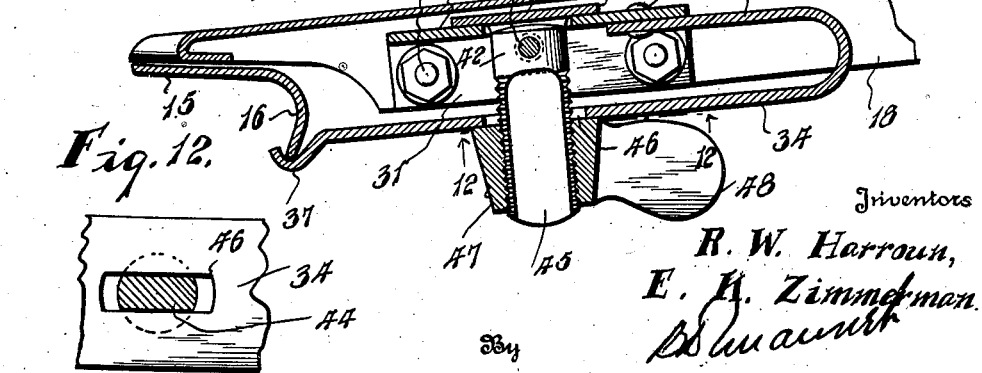
Inventors
R. W. Harroun,
E. K. Zimmerman.
By
Attorney

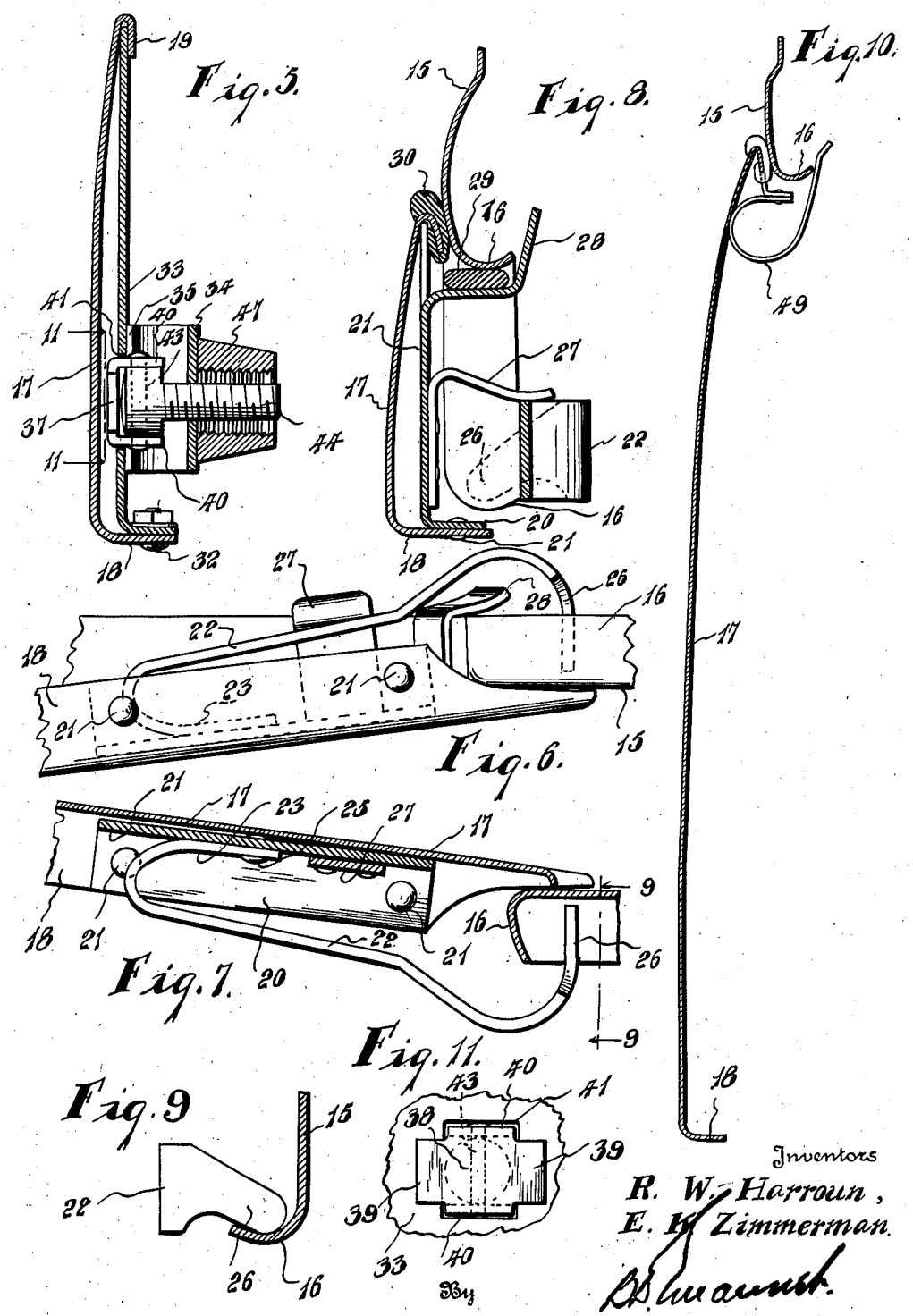

Patented June 6, 1939

2,161,160

UNITED STATES PATENT OFFICE 2,161,160

WHEEL GUARD

Ray W. Harroun and Emory K. Zimmerman, Detroit, Mich., assignors to Aero-Style Corporation, Indianapolis, Ind., a corporation of Indiana Application March 19, 1935, Serial No. 11,885

9 Claims. (Cl. 280—153)

This invention relates to certain new and useful improvements in wheel guards.

The primary object of the invention is to provide a wheel guard in the form of a guard wall which is adapted to close a side opening in a vehicle through which a wheel is mounted and dismounted and is of a type to permit quick placement and displacement thereof relative to the side opening for access to the wheel.

A further object of the invention is to provide a wheel guard of the foregoing character clampingly engaged at opposite ends with corresponding portions of the edges of the side opening in the vehicle with one clamping connection initially engaged with the wheel guard initially positioned slightly offset from the opening and moved into position to permit the clamping member at the other end to become operative with the latter clamping member constituting a latch connection between the wheel guard and cooperating edge of the side opening.

A still further object of the invention is to provide a wheel guard of the foregoing character wherein a binding or cramping action is effected between the wheel guard and edge of the wall surrounding the wheel opening to eliminate vibratory movement between the wheel guard and wall when the wheel guard is in its closed position.

With the above and other objects in view that will become apparent as the nature of the invention is better understood, the same consists in the novel form, combination and arrangement of parts hereinafter more fully described, shown in the accompanying drawings and claimed.

In the drawings:

Figure 1 is a fragmentary inner side elevational view of the wheel guard engaged with the edge of a wheel fender with the devices for holding the guard wall in closed position carried by opposite ends of the guard wall and engaged with corresponding points on the fender;

Figure 2 is a fragmentary bottom plan view showing the guard wall engaged with the fender;

Figure 3 is an enlarged fragmentary bottom plan view showing the latch connection between one end of the guard wall and fender;

Figure 4 is a detail sectional view taken on line 4—4 of Figure 1, showing the nut and screw combination for moving the resilient arm of a lamp carried by the guard wall into binding engagement with an edge of the fender;

Figure 5 is a detail sectional view taken on line 5—5 of Figure 1;

Figure 6 is a fragmentary bottom plan view of the clamping connection between the opposite end of the guard wall and fender;

Figure 7 is a detail sectional view taken on line 7—7 of Figure 1;

Figure 8 is a detail sectional view taken on line 8—8 of Figure 1;

Figure 9 is a detail sectional view taken on line 9—9 of Figure 7;

Figure 10 is a sectional view taken on line 10—10 of Figure 1, showing the spring clip connection between the upper end of the guard wall and fender;

Figure 11 is a detail sectional view taken on line 11—11 of Figure 5; and

Figure 12 is a detail sectional view taken on line 12—12 of Figure 4.

It is to be understood that the wheel guard is in the form of a guard wall to overlie a part of a vehicle wheel and to close a side opening through which the wheel is mounted and dismounted and such side opening may appear either in a wheel fender or in the side of a vehicle body in the absence of a fender and for purposes of clarity, the wheel guard is shown and will be described as associated with a wheel fender.

The wheel guard is illustrated as associated with the fender 15 that has a lower curved edge flanged inwardly as at 16.

The guard wall 17 is of substantially semicircular formation with a lower straight edge flanged inwardly as at 18 with the upper edge flanged inwardly as at 19 and curved incident to the curvature of the flanged edge 16 of the fender, the guard wall being spaced in overlapping relation at the outer side of the wheel fender 15 as illustrated in several of the figures. Devices are carried by the front and rear lower corners of the guard wall 17 at the inner side thereof to facilitate attachment of the guard wall to the fender 15, one of the devices being initially engaged with the flanged edge 16 of the fender with such engagement transformed into a resilient cramping action when the guard wall is moved upwardly at its lower end to place the other device in engagement with the fender with the latter device constituting locking means for rigidly retaining the guard wall in closed position against vibratory movements relative to the fender.

As shown in Figs. 1 and 6 to 9, an angle bracket comprising a base portion 20 is secured as at 21 to the flange 18 of the guard wall with a vertical bracket plate 21 rising from the base 20 and having a part thereof confined within the flange 19 of the guard wall as shown in Figure 1. A resilient clamping arm 22 of U-shape has the short leg 23 thereof anchored as at 25 to the vertical bracket plate 21, the clamping arm 22 extending parallel with the lower edge of the guard wall 17 with the free end thereof fashioned as in Figures 7 and 9 to provide a hook or finger 26 adapted for engagement with the adjacent portion of the flange 16 of the fender 15. A resilient arm 27 carried by the bracket plate 21 overlies and is engaged with the upper side edge of the resilient clamping arm 22 for maintaining the latter in position and adding further resilient clamping action thereto. The guard finger 28 angularly rises from the vertical bracket plate 21 and is adapted to be disposed inwardly of the curved edge 16 of the fender as shown in Figure 8.

When it is desired to mount the wheel guard in position in the side opening of the wheel fender 15, the guard wall 17 is initially positioned below said opening, the resilient arm 22 being manually extended to position the finger 26 thereof at the inner side of the flange 16 of the fender, while the guard finger 28 carried by the bracket plate 21 is disposed to extend over the free end of the fender flange 16 and when in such position, the other end of the guard wall is elevated, this movement causing a binding engagement between the finger 26 of the clamping arm 22 and the fender and such action increased by the resilient arm 27 being engaged with the clamping arm 22. A cushion gasket 29 is interposed between the guard finger 28 and the fender flange 16 to eliminate vibratory movement, while, as shown in Figure 8, a pad 30 is carried by the upper curved edge of the guard wall to contact the fender 15 to prevent marring of the surface thereof.

A latch connection is established between the opposite ends of the guard wall and fender for retaining the guard wall in closed position relative to the fender opening and the latch connection is shown more clearly in Figures 1 to 5, 11 and 12. The latch connection includes an angle bracket having a base plate 31 anchored as at 32 to the lower edge flange 18 of the guard wall and a vertical bracket plate 33 rising therefrom. A longitudinally extending U-shaped clamping arm 34 has the short leg 35 thereof secured as at 36 to the vertical bracket plate 33 and the free end of the clamping arm 34 is fashioned as at 37 for clamping engagement with the edge of the fender flange 16. A screw and nut combination is associated with the vertical bracket plate 33 and clamping arm 34 for causing the latter to bindingly engage the fender flange, the support for the screw as shown more clearly in Figs. 4, 5 and 11 comprising a rectangular plate 38 having a pair of diametrically opposite ears 39 in the plane thereof and a pair of diametrically opposite ears 40 bent at right angles to the plate to extend through the rectangular opening 41 in the vertical bracket plate 33, the ears 39 being engaged with the outer side of the bracket plate as shown in Figures 4 and 11. The head 42 of the screw is positioned between the ears 40 and is connected thereto by the cross pin 43, the threaded shank 44 of the screw having flattened unthreaded diametrically opposite sides 45 that extend through a rectangular opening 46 in the resilient clamping arm 34 for the reception of the nut 47 threaded thereon for engagement with the resilient clamping arm by means of the finger piece or wing 48. The nut 47 causes the end 37 of the resilient clamping arm 34 to be bindingly engaged with the free edge of the fender flange 16 for holding the guard wall 17 in closed position in cooperation with the clamping arm 22.

Resilient clips 49 are carried by the upper curved edge of the guard wall 17 as shown in Figures 1 and 10 for engagement with the fender flange 16 and cooperate with the clamping devices for holding the guard wall against vibratory movement.

From the above detailed description of the invention, it is believed that the construction and operation thereof will at once be apparent, it being noted that when the guard wall is placed in position in the fender or body opening housing the wheel, the clamping arm 22 is sprung outwardly to position the finger 25 thereof into the fender flange 16 while the guard finger 28 carried by the vertical bracket 21 with which the clamping arm 22 is associated is positioned at the inner side of fender flange so that when the opposite end of the guard wall is elevated to position the clamping arm 34 for engagement with the fender flange, the clamping arm 22 is placed under further tension, aided by the resilient arm 27 to cause a tensioned and cramping action between the clamping arm 22 and the wheel fender. The clamping arm 22 functions as a resilient pivotal connection between the guard wall and fender while the clamping arm 34 functions as a latch or lock for securing the guard wall in position, the clamping arm 22 being placed under tension and given a cramping action when the guard wall is in closed position to restrain the same from vibratory movement.

While there is herein shown and described the preferred embodiment of the invention, it is nevertheless to be understood that minor changes may be made therein without departing from the spirit and scope of the invention as claimed.

What is claimed is:

1. In a fender and wheel guard combination where the wheel guard is adapted to be held in position by the fender, means at one end of the guard wall for effecting a tensioned cramping engagement with the fender when in closed position and a loose engagement when pivoted about said end to be moved away from said closed position, and latching means at the other end for maintaining the guard wall in closed relation with the fender.

2. In a fender and wheel guard combination where the wheel guard is adapted to be held in position by the fender, means located at one end of the guard wall for effecting a tensioned cramping engagement with the fender when in closed position and a loose engagement when pivotally moved away from said closed position, and releasable latching means disposed on the inside of the guard wall for effecting a non-vibratory closed position relative to said fender.

3. In a fender and wheel guard combination where the wheel guard is adapted to be held in position by the fender, initial supporting means at one end of the guard wall for positioning the guard wall in the plane of the guard wall and beneath the opening, spring means adjacent said supporting means for engaging the same to effect a cramping action when the guard wall is moved in the plane of the opening into closed position within the opening and tensioned latching means at the opposite end of the guard wall for maintaining it in a closed relation within the opening, and resilient means interposed between the ends of the guard wall for maintaining a snug interlocking engagement between the top thereof and the edge of the opening.

4. A two part vehicle fender comprising a main wall having an opening through which the wheel may be dismounted, a guard wall overlapping the outside edge of the main wall adjacent said opening, means overlapping the inside edge of said opening tensioned to effect snug engagement between the guard wall and outside edge of said opening, initial supporting means at one end of the guard wall for positioning in a "jack knife" opened relation with the opening, a resilient spring arm means adjacent said supporting means for contacting the same and effecting a cramping action when the guard wall is moved "jack knife" fashion into closed engagement with the opening, means for retaining the guard wall in said closed engagement comprising a tensioned arm overlapping the inside edge of the opening, and manually operated means at the other end of the guard wall for gripping the edge of the opening between said arm and a portion of the guard wall overlapping the outside edge of the opening.

5. In a structure for covering a wheel of an automotive vehicle of the type having a fender overlying a portion of the periphery of a wheel and having a side opening, a guard member for closing said opening, and means for securing the guard member to the fender comprising spring means at one end of the guard wall so shaped and positioned as to effect a tensioned cramping engagement of the guard wall with the fender when the two ends of the fender adjacent the side opening and the bottom of the guard are parallel, and a loose engagement when the guard is moved downwardly from said position and latching means at the other end of the guard member for maintaining the guard member in non-vibratory engagement when in closed tension relation with the fender.

6. In a structure for covering a wheel of an automotive vehicle of the type having a fender overlying a portion of the periphery of a wheel and having a side opening, a guard member for closing said opening, and means for securing the guard member to the fender comprising, attachment means between one end of the guard wall and the closure opening effective for interlocking cramping engagement when in closed position between the guard wall and the fender and removable engagement when in partly open position and latching means for maintaining a closed position of the guard wall and the fender comprising, a tensioned clamping arm located on the inside of the guard wall and the inside edge of the fender wall adjacent the opening and manually operable means for causing the clamping arm to grip the edge of the fender between said arm and a portion of the guard wall overlapping the outside edge of. the fender.

7. In a structure for covering a wheel of an automotive vehicle of the type having a fender overlying a portion of the periphery of a wheel and having a side opening, a guard member for closing said opening, and means for securing the guard member to the fender comprising, initial supporting means at one end of the guard wall for positioning the guard wall in the plane of the opening and beneath the opening, resilient means adjacent said supporting means for contacting the same and for effecting a cramping action when the guard wall is moved upwardly into closed position with the fender within the opening and means for retaining the guard wall in said closed position with the fender.

8. In a structure for covering a wheel of an automotive vehicle of the type having a fender overlying a portion of the periphery of a wheel and having a side opening, a guard member for closing said opening, and means for securing the guard member to the fender comprising, initial supporting means at one end of the guard wall for positioning the guard wall in the plane of the fender wall and beneath the opening, a resilient means adjacent said supporting means for contacting the same and for effecting a cramping action when the guard wall is moved in the plane of the opening into closed position with the fender within the opening, and means for retaining the guard wall in said closed position with the fender comprising a tensioned arm overlapping the inside edge of the fender and manually operated means for causing the arm to grip the edge of the fender between said arm and a portion of the guard wall overlapping the outside edge of the fender.

9. In a structure for covering a wheel of an automotive vehicle of the type having a fender overlying a portion of the periphery of a wheel and having a side opening, a guard member for closing said opening, and means for securing the guard member to the fender comprising, initial supporting means at one end of the guard wall and beneath the opening, spring means adjacent said supporting means for engaging the same and for effecting a cramping action when the guard wall is moved in the plane of the opening into closed position with the fender within the opening and tensioned latching means at the opposite end of the guard wall for maintaining it in a closed relation to the fender within the opening, and resilient means interposed between the ends of the guard wall for maintaining a snug interlocking engagement between the top thereof and the edge of the fender.

RAY W. HARROUN.
EMORY K. ZIMMERMAN.